United States Patent
Koo

(10) Patent No.: US 11,753,971 B2
(45) Date of Patent: Sep. 12, 2023

(54) METHOD FOR VERIFYING CVVD LOCATION LEARNING RESULT AND CVVD SYSTEM THEREOF

(71) Applicants: HYUNDAI MOTOR COMPANY, Seoul (KR); KIA CORPORATION, Seoul (KR)

(72) Inventor: Bon-Chang Koo, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/826,286

(22) Filed: May 27, 2022

(65) Prior Publication Data

US 2022/0282646 A1    Sep. 8, 2022

Related U.S. Application Data

(62) Division of application No. 16/211,911, filed on Dec. 6, 2018, now Pat. No. 11,391,188.

(30) Foreign Application Priority Data

Sep. 3, 2018 (KR) .................. 10-2018-0104795

(51) Int. Cl.
  *F01L 13/00* (2006.01)
  *F02D 13/02* (2006.01)
  *G06N 20/00* (2019.01)

(52) U.S. Cl.
  CPC ...... *F01L 13/0015* (2013.01); *F02D 13/0207* (2013.01); *F01L 2800/09* (2013.01); *F01L 2800/12* (2013.01); *G06N 20/00* (2019.01)

(58) Field of Classification Search
  CPC .............. F01L 13/0015; F01L 2201/00; F02D 13/0207; F02D 2200/101; F02D 2200/501; F02D 2200/021; F02D 2200/602; F02D 2200/70; F02D 2200/0414
  See application file for complete search history.

(56) References Cited

U.S. PATENT DOCUMENTS

| 4,744,343 | A  |   | 5/1988  | Bisenius et al. |
| 6,325,029 | B1 | * | 12/2001 | Takahashi ........... F02D 13/0219 123/90.15 |
| 9,932,908 | B2 |   | 4/2018  | Ryu et al. |
| 9,964,049 | B2 |   | 5/2018  | Kim et al. |

(Continued)

FOREIGN PATENT DOCUMENTS

| JP | 2013167223 A | 8/2013 |
| KR | 100749272 B1 | 8/2007 |

(Continued)

*Primary Examiner* — Devon C Kramer
*Assistant Examiner* — Kelsey L Stanek
(74) *Attorney, Agent, or Firm* — LEMPIA SUMMERFIELD KATZ LLC

(57) ABSTRACT

A continuously variable valve duration (CVVD) system includes a controller configured to determine whether a learning value existing in the CVVD system is required to be verified during one of a hardware abnormality, a learning value abnormality, and a motor voltage abnormality. In particular, the controller performs a learning value verification control using a rotation detection value and switches from a learning value verification control to a re-learning control when re-learning is required.

3 Claims, 7 Drawing Sheets

(56) References Cited

U.S. PATENT DOCUMENTS

| | | | | |
|---|---|---|---|---|
| 2008/0017151 A1* | 1/2008 | Kusaka | ................. | F01L 9/20 |
| | | | | 123/90.31 |
| 2011/0100312 A1* | 5/2011 | Hirata | ................. | F01L 1/022 |
| | | | | 123/90.17 |
| 2014/0330475 A1* | 11/2014 | Shibata | ............... | B60K 6/445 |
| | | | | 180/65.265 |
| 2016/0153369 A1 | 6/2016 | Kim et al. | | |
| 2017/0167407 A1 | 6/2017 | Ryu et al. | | |

FOREIGN PATENT DOCUMENTS

| | | |
|---|---|---|
| KR | 101575304 B1 | 12/2015 |
| KR | 101744830 B1 | 6/2017 |

* cited by examiner

METHOD FOR VERIFYING CVVD LOCATION LEARNING RESULT AND CVVD SYSTEM THEREOF

CROSS-REFERENCE TO RELATED APPLICATION

This application is a divisional application of non-provisional U.S. patent application Ser. No. 16/211,911, filed on Dec. 6, 2018, which claims priority to and the benefit of Korean Patent Application No. 10-2018-0104795, filed on Sep. 3, 2018, the entire contents of each of which are incorporated herein by reference.

FIELD

The present disclosure relates to continuously variable valve duration (CVVD) location learning.

BACKGROUND

The statements in this section merely provide background information related to the present disclosure and may not constitute prior art.

In general, a continuously variable valve duration (CVVD) system performs valve duration (that is, duration of a cam driving an intake valve, which refers to a period in which the intake valve is in an open state) learning at the initial stage of engine assembly in an end of line to perform an accurate duration/timing control operation. In this case, the valve duration learning of the end of line means CVVD location learning by initial learning or end of line learning.

For example, the CVVD location learning is a method for rotating a control shaft, which is connected with the cam driving the intake valve, by a rotor to change the cam duration (that is, valve duration) and determining a location value of the control shaft by an RPM of the control shaft to determine the duration (that is, period in which the intake valve is the open state).

As a result, the CVVD location learning secures the accuracy of the duration/timing control operation of the CVVD system assembled with an engine, and the CVVD system accurately drives engine ignition timing to perform an engine control without starting off the engine.

SUMMARY

The CVVD system has various causes that make desirable, or require, the verification of the CVVD location learning result.

For example, various causes may be due to hardware aspects of the CVVD system such as motor power fail, connector detachment, and CVVD microcomputer fail. In this case, even if the duration determination is made as a result of the CVVD location learning, an air volume cannot be controlled, and therefore, the start-off of the engine, idle instability and deterioration in fuel economy may occur.

Therefore, CVVD location learning is required to perform re-learning when the accuracy of the determination on the duration due to the hardware aspects of the CVVD system is unsecured.

In view of the above, an aspect of the present disclosure is directed to a method for verifying a CVVD location learning result and a CVVD system thereof capable of verifying learning values for a short duration and a long duration, respectively, by a detection value of the auxiliary cam sensor which is applied to a camshaft to prevent start-off of an engine, idle instability, and deterioration in fuel economy which are caused by not verifying learning abnormality, and in particular, re-learning each of the short/long durations at ignition timing after learning abnormality timing when system hardware fail (or error) and a loss of the learning values occur to prevent an occurrence in sudden output change of the engine due to the re-learning.

The principles of the present disclosure can be understood by the following description.

In accordance with an aspect of the present disclosure, a method for verifying a CVVD location learning result includes: performing a learning value verification control by confirming a position of a control shaft connected to a motor with a signal value of an auxiliary cam sensor for a rotation of a camshaft if a controller determines that a learning value acquired in a short duration and a long duration of a CVVD system is required to be verified.

A necessity of the learning value verification may be based on each of CVVD system hardware abnormality, and learning value abnormality, and motor voltage abnormality as conditions, and the learning value verification control may be performed when all the conditions are not satisfied, and it may be determined that learning is abnormal when any one of the conditions is satisfied, learning abnormality to switch from the learning value verification control to the re-leaning control for learning each of the long duration and the short duration.

The learning value verification control may be divided into a long position verification control, in which a signal value of the auxiliary cam sensor is applied to a threshold, for the long duration and a short position verification control, in which a threshold is applied to the signal value of the auxiliary cam sensor, for the short duration.

The long position verification control may be performed by performing a long duration control execution by rotating the motor, applying long duration thresholds for HIGH SIGNAL A and HIGH SIGNAL B, respectively, dividing the signal value of the auxiliary cam sensor as the threshold, and verifying that the learning for the long duration is normal by satisfying the condition of the long duration threshold. The HIGH SIGNAL A and the HIGH SIGNAL B may each be a signal holding time having a signal value of the auxiliary cam sensor detecting an auxiliary target wheel positioned at a middle portion of the cam shaft, and the satisfaction of the long duration threshold value may be determined as the signal holding time. The switching to the learning control may be made when the condition of the long duration threshold is not satisfied.

The short position verification control may be performed by performing a short duration control execution by rotating the motor, applying short duration thresholds for HIGH SIGNAL A and HIGH SIGNAL B, respectively, dividing the signal value of the auxiliary cam sensor as the threshold, and verifying that the learning for the short duration is normal by satisfying the condition of the short duration threshold. The HIGH SIGNAL A and the HIGH SIGNAL B may each be a signal holding time having a signal value of the auxiliary cam sensor detecting an auxiliary target wheel positioned at a middle portion of the cam shaft, and the satisfaction of the short duration threshold value may be determined as the signal holding time. The switching to the learning control may be made when the condition of the short duration threshold is not satisfied.

The CVVD system hardware abnormality may be motor connector connection fail which prevents CAN communication between the motor and the controller. The learning value abnormality may be a learning value loss by a reset of the learning value. The motor voltage abnormality may be a voltage drop.

The re-learning control may be completed by storing a learning value acquired by the short duration learning subsequent to the long duration learning at next ignition timing from learning abnormality timing.

In accordance with an aspect of the present disclosure, a CVVD system includes: a controller determining a verification necessity for the existing learning value on a condition of CVVD system hardware abnormality, learning value abnormality, and motor voltage abnormality, respectively, and performing a learning value verification control using a rotation detection value, and performing a long duration and a short duration by switching from the learning value verification control to the re-learning control when the re-learning is required.

The auxiliary cam sensor may form a pair with a cam sensor, the cam sensor may be provided at an end portion of the cam shaft, and the auxiliary cam sensor may be positioned at a middle portion of the cam shaft. The auxiliary cam sensor may generate a rotation detection value of the cam shaft by an A protrusion and a B protrusion of an auxiliary target wheel and the auxiliary target wheel may be provided at a middle portion of the cam shaft.

The controller includes a CVVD learning verification map, and the CVVD learning map may provide a signal for the CVVD system hardware abnormality or not, the learning value abnormality or not, and the motor voltage abnormality or not to the controller.

The controller may control a continuously variable valve timing (CVVT) system for directly control the cam shaft.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
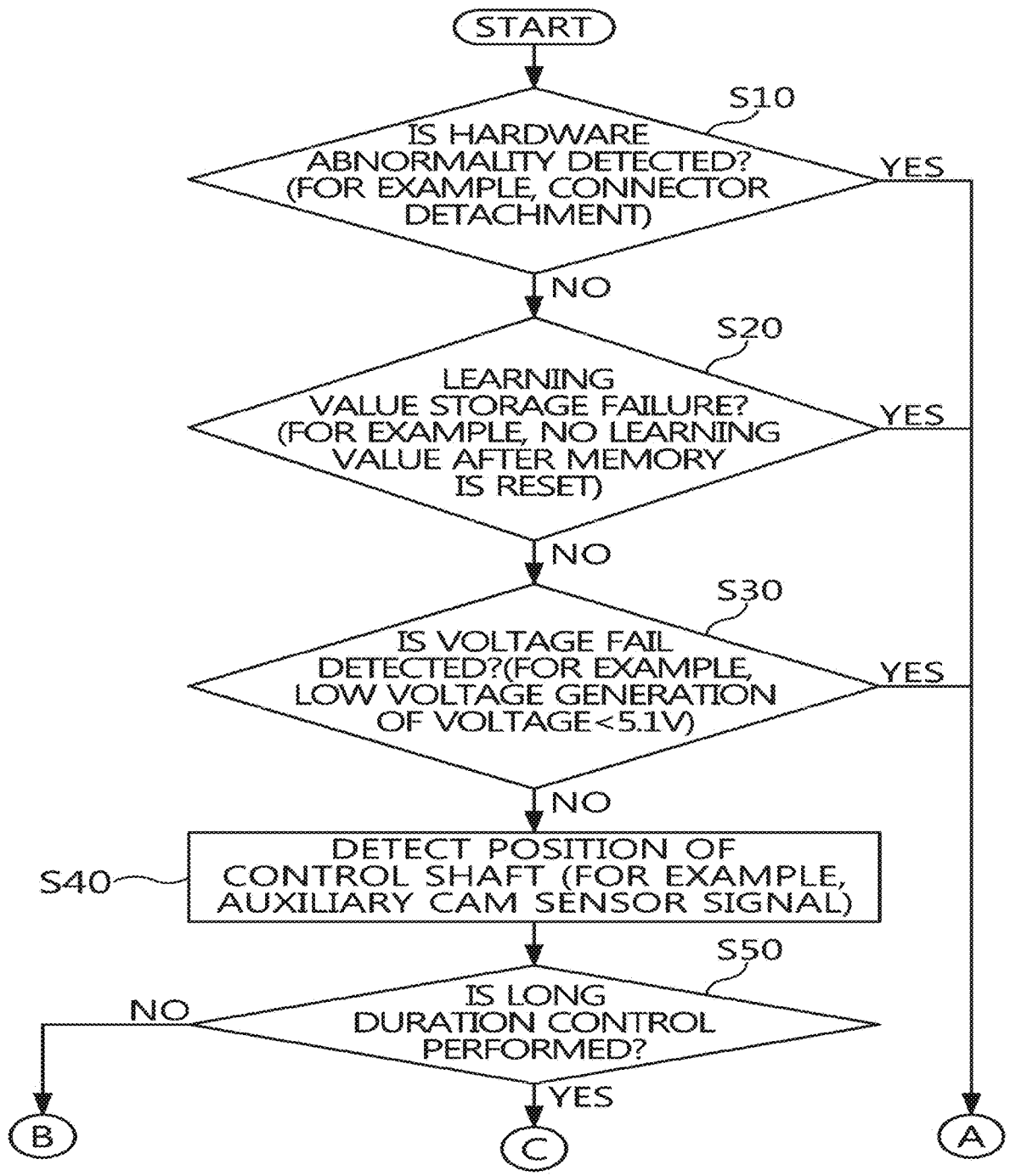
FIGS. 1A, 1B and FIG. 2 are flowcharts of a method for verifying a CVVD location learning result.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1B:
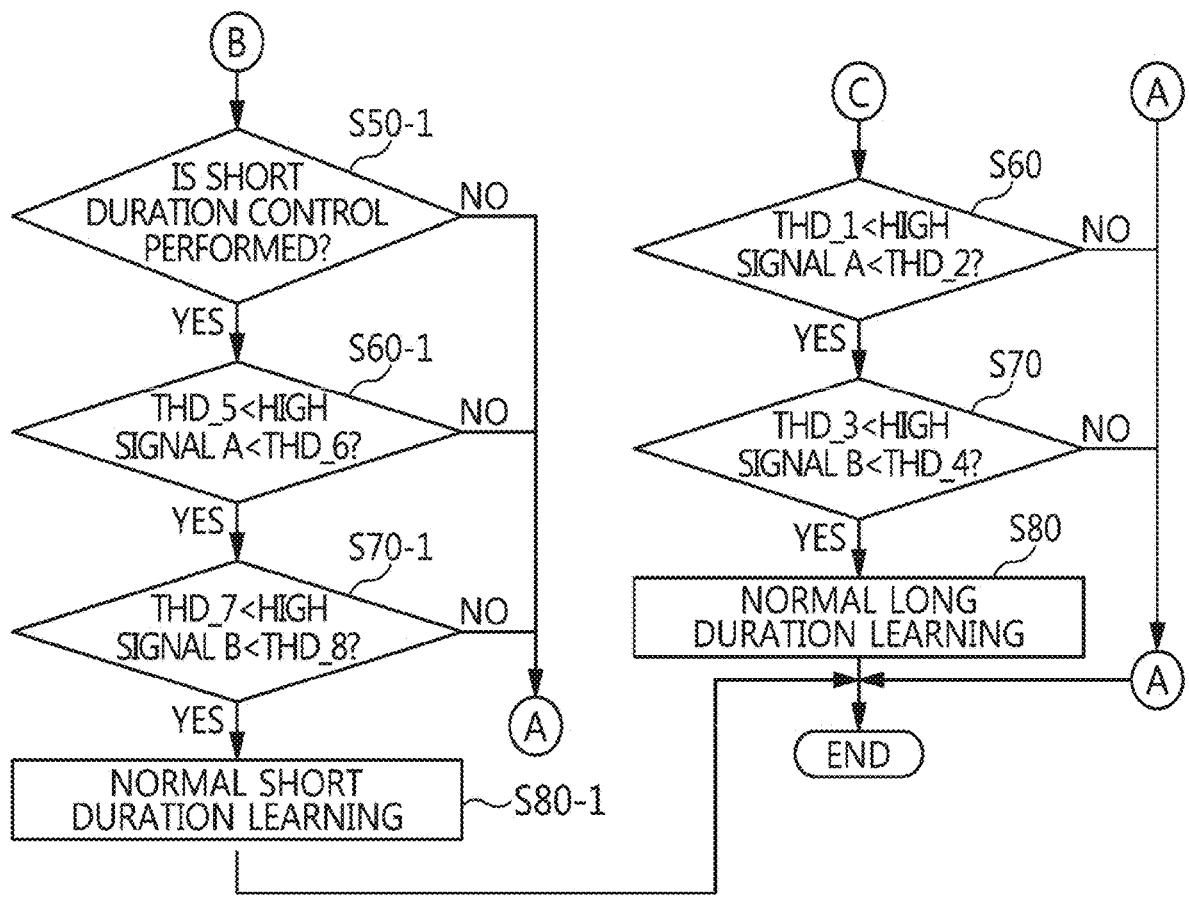
Figure 2:
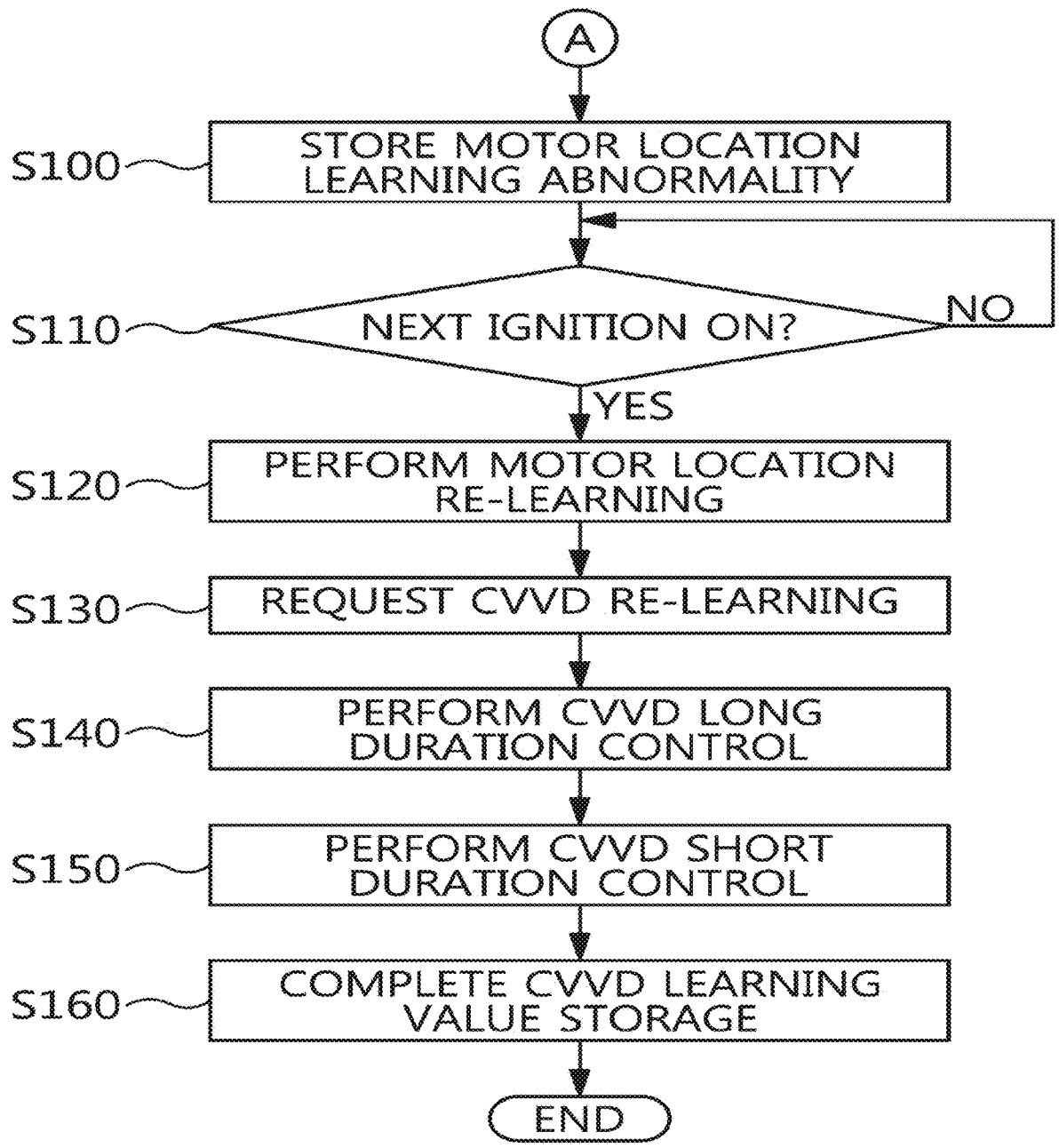

Referring to FIGS. 1A, 1B and FIG. 2, a method for verifying a continuously variable valve duration (CVVD) location learning result is classified into a learning abnormality entry control (S10 to S40) using a sensor for learning abnormality of existing learning, a learning value verification control (S50 to S80 and S50-1 to S80-1), and a re-learning control for a new learning value (S100 to S160).

From this, the method for verifying a CVVD location learning result monitors an auxiliary cam sensor signal during a control of a short duration and a long duration in the learning abnormal entry control (S10 to S40) to monitor whether a signal value corresponding to the corresponding duration is output. Next, it is determined that there is no output of the signal value corresponding to the corresponding duration through the monitoring, or that any one of motor connector detachment, motor low voltage generation, and learning value storage failure is learning abnormality, and the method for verifying a CVVD location learning result is converted into the re-learning control (S100 to S160) to perform re-learning. In addition, the method for verifying a CVVD location learning result performs the re-learning control (S100 to S160) at next ignition timing.

As a result, the crosscheck type CVVD location learning method may have the following advantages. Only a target value of the control shaft is checked by a position sensor (or a rotation angle sensor) without considering a duration of an intake valve is finally determined by a housing and a link connecting between a control shaft of the motor and a camshaft, such that a disadvantage of the existing method of the CVVD system which cannot measure an actual duration of the intake valve is eliminated by an auxiliary cam sensor newly mounted on the camshaft. Furthermore, it is possible to determine alignment of the housing and the link by monitoring the auxiliary cam sensor, and it is also possible to determine whether or not each part of the hardware, which is items corresponding to OBD regulations for the CVVD system, is normal.

Figure 3:
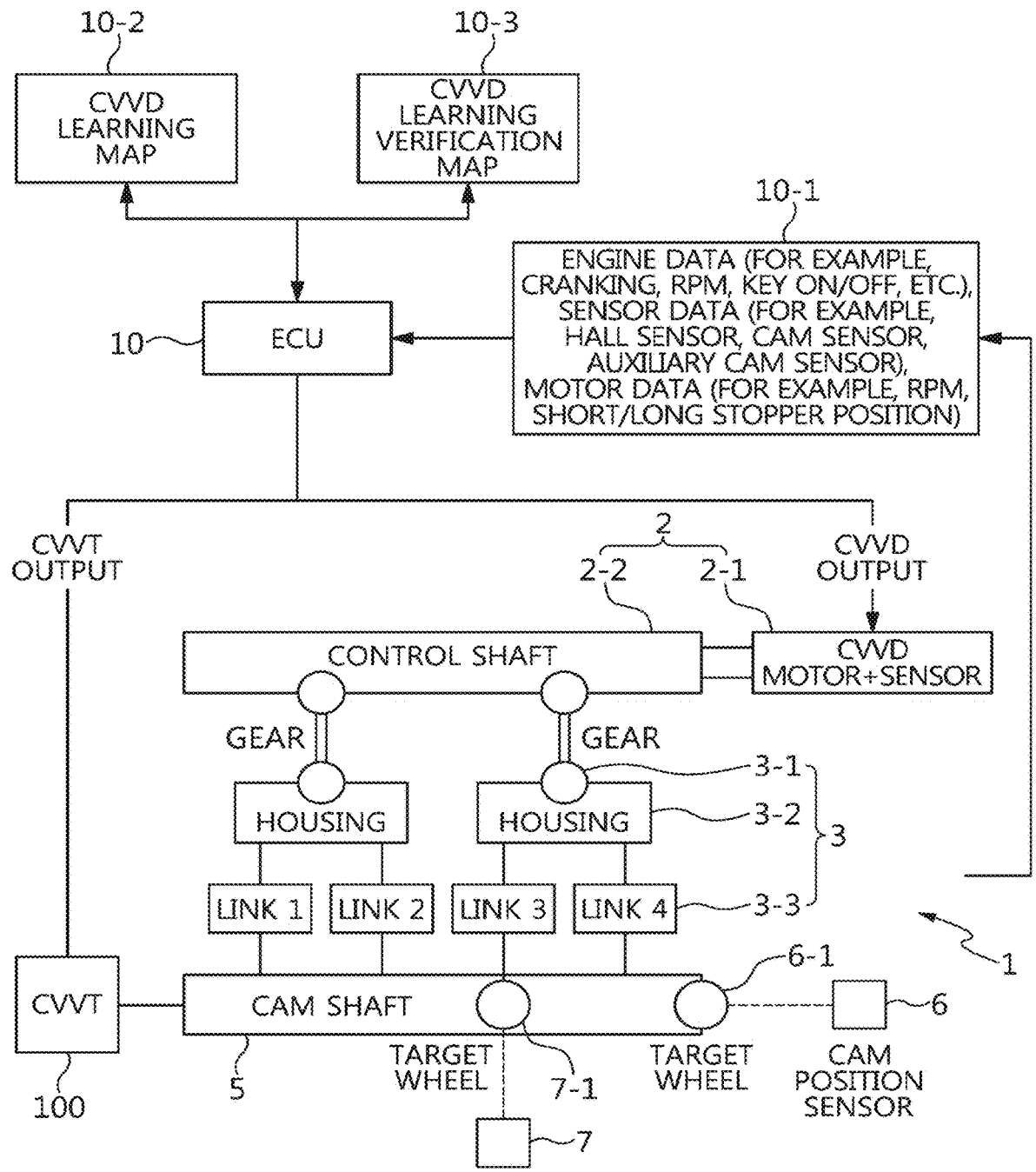
FIG. 3 is a diagram showing a configuration example of a CVVD system for verifying a CVVD location learning result.

Referring to FIG. 3, a CVVD system 1 includes a CVVD controller 2, a CVVD mechanism unit 3, a cam sensor 6, and an auxiliary cam sensor 7 as constituent elements, is assembled in an engine 200 (see FIG. 6), is connected with a continuously variable valve timing (CVVT) system 100, and includes a controller 100 for controlling the CVVD mechanism unit 3 and the CVVT system 100.

Figure 5:
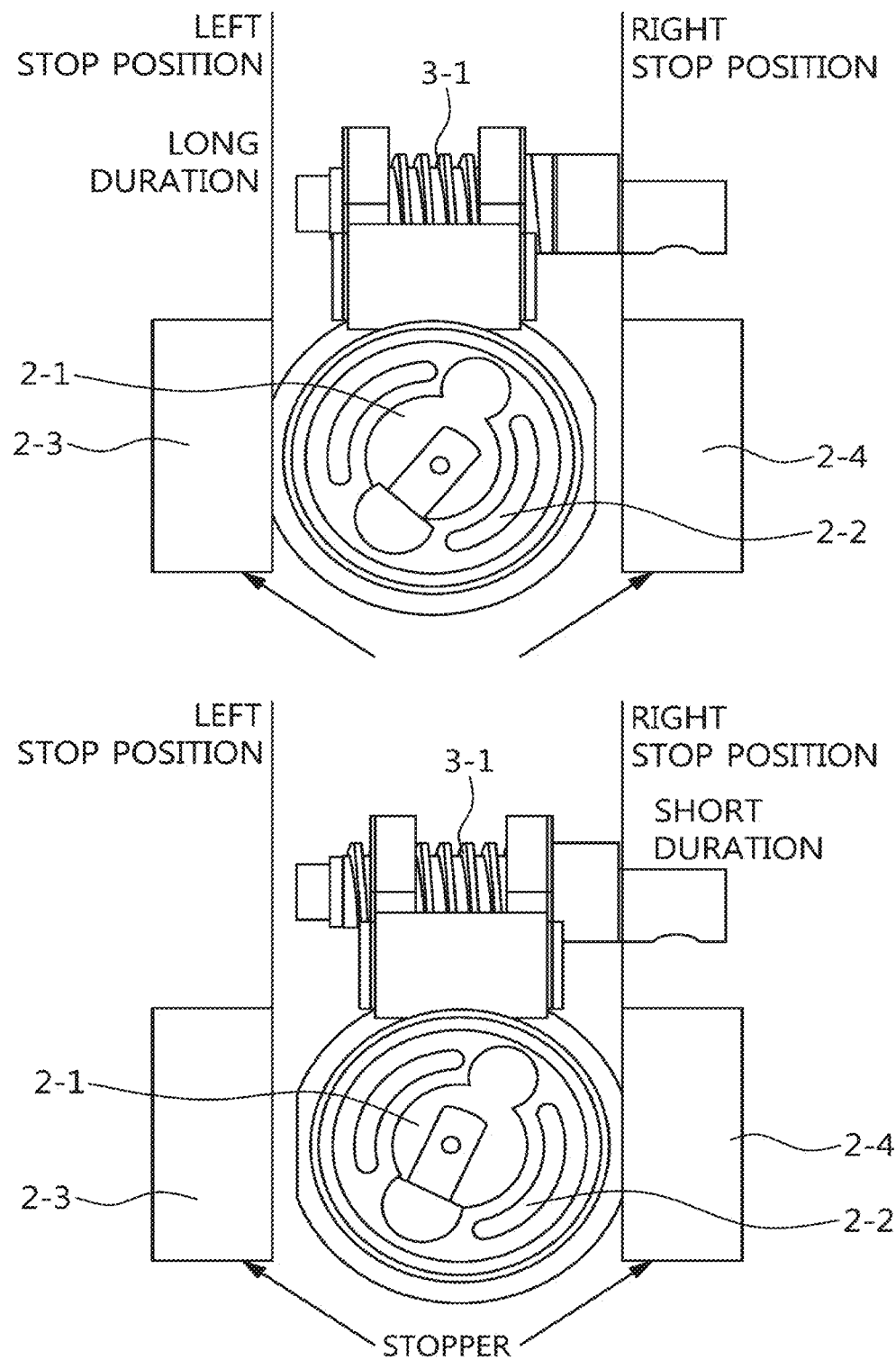
FIG. 5 is a diagram showing an example of a rotation control of short/long durations of a motor for the existing learning value verification and re-learning value acquisition in the CVVD system.

For example, the CVVD controller 2 includes a brushless direct current (BLDC) three-phase type motor 2-1, a control shaft 2-2 connected with the camshaft 5 and rotated by a motor 2-1, and a stopper 2-3 (see FIG. 5). In particular, the stopper 2-3 (see FIG. 5) is a mechanical stopper which is provided at an end portion of the control shaft 2-2 to check an arrival of the short/long positions with respect to the rotation of the motor 2-1 by a physical contact. The CVVD mechanism unit 3 includes a gear 3-1 connected to the control shaft 2-2, a housing 3-2 constituting an appearance shape, and a link 3-3 connected to the camshaft, and is assembled with the camshaft for opening and closing intake/exhaust valves.

For example, the cam sensor 6 is located at the end portion of the camshaft 5, and provides a rotation angle of the camshaft detected by recognizing a protrusion of a target wheel 6-1 formed around the camshaft 5 to the controller 10. The auxiliary cam sensor 7 is located at a middle portion of the cam shaft 5, and provides the rotation angle of the cam shaft detected by recognizing the protrusion (for example, referring to a protrusion 7-1*a* at an initial position and a protrusion 7-1*b* at a rotation position in FIG. 5) of the auxiliary target wheel 7-1 formed around the cam shaft 5 to the controller 10. Therefore, the auxiliary cam sensor 7 is newly applied as a separate sensor from the cam sensor 6. In this case, the rotation angle detected by the auxiliary cam sensor 7 is built in the motor 2-1 to verify a Hall sensor (not shown) for detecting the short/long positions and correct abnormality (for example, Hall missing). Here, the Hall missing means that an actually generated RPM of the motor is recognized to be a much smaller value so that a greater amount of rotation is generated in the motor than the motor rotation amount converted into the Hall sensor signal value following up the target position.

For example, the controller 10 detects and controls an occurrence of a duration error by checking and monitoring the duration using the auxiliary cam sensor 7 to determine the learning abnormality and implement the re-learning. To this end, the controller 10 includes a data input unit 10-1, a CVVD learning map 10-2, and a CVVD learning verification map 10-3. Therefore, the controller 10 is constituted by an electronic control unit (ECU) driver for controlling these components.

More specifically, the data input unit 10-1 detects an engine data including a vehicle speed, accelerator pedal opening, a battery voltage, a coolant temperature/intake temperature range and the like together with engine cranking (a rotation state of a crankshaft by a start motor), an engine RPM (revolution per minute), and a key on/off (ignition), detects a sensor data including detection value abnormality of a sensor (for example, Hall sensor, cam sensor 6) for the short/long positions of the control shaft, a communication error (for example, CAN communication error of EMS with the CVVD system), and a loss of the learning values (for example, value stored in a memory of the map 10-2 or the controller 10) of the short/long durations using the stopper (no shown) of the control shaft, and detects a motor data including the motor abnormality or the like due to the connector detachment and the low voltage together with the RPM of the motor 2-1.

Specifically, the CVVD learning map 10-2 stores and updates the location learning values for the short duration and long duration control. The CVVD learning verification map 10-3 generates a learning abnormality signal for any one of no duration signal value output, the motor connector detachment, the motor low voltage generation, and the learning value storage failure.

For example, the CVVT system 100 directly controls the camshaft 5 so that the valve opening/closing timing is changed at the same time while the short/long durations are fixed by the controller 10. Therefore, the CVVT system 100 controls opening and closing timing (e.g., intake valve open (IVO) and intake valve close (IVC)) and an opening amount of a valve according to the rotation range of the engine to control overlap timing, thereby adjusting a cylinder charging amount and a residual gas amount.

Hereinafter, the method for verifying a CVVD location learning result of FIGS. 1A, 1B and FIG. 2 will be described in detail with reference to FIGS. 3 to 6. In this case, a control subject is the controller 10 and a target to be controlled is the CVVD system 1. A target to be detected includes the temperature, the vehicle speed, the ignition key, the accelerator pedal opening, the battery voltage, the starter motor, or the like together with the motor, the voltage, the CAN, the auxiliary cam sensor 7, and the learning value which are to be monitored.

Referring to FIGS. 1A and 1B, the controller 10 divides the learning abnormality entry control (S10 to S40) into a CVVD hardware abnormality detection step (S10), a learning value storage failure check step (S20), a supply voltage abnormality detection step (S30), and a control shaft location detection step (S40). In this case, the CVVD hardware abnormality detection step (S10), the learning memory check step (S20), and the supply voltage abnormality detection step (S30) are sequentially performed, but the order may be changed from the actual aspect.

Referring to FIG. 3, the operation of the controller 10 for the learning abnormal entry control (S10 to S40) can be known. In order to perform the CVVD hardware abnormality detection step (S10), the controller 10 checks the engine data, the sensor data, and the motor data provided from the data input unit 10-1, and checks the sensor detection value abnormality, the CAN abnormality, and the learning value loss which are included in the sensor data, and the low voltage generation of the motor supply voltage included in the motor data.

First, in the CVVD hardware abnormality detection step (S10), the hardware communication state for the CVVD controller 3 is used. For example, the controller 10 determines the CVVD hardware abnormality as the motor connector detachment problem when the CAN communication with the motor 2-1 is impossible for about two seconds. In addition, the controller 10 checks the sensor detection value abnormality for detecting the hardware abnormality when there is no motor connector detachment, and detects the CVVD hardware abnormality as the sensor problem (any one of the Hall sensor and the cam sensor 6) such as the sensor detection value abnormality.

Next, in the learning value storage failure check step (S20), the learning value stored in the CVVD learning map 10-2 of the CVVD system 1 or in the memory of the controller 10 is used. For example, the controller 10 checks the learning value storage failure when the learning value cannot be detected after the memory reset or the initial learning value among the existing learning values is detected the learning value.

In the supply voltage abnormality detection step (S30), the supply voltage to the motor 2-1 of the CVVD controller 2 is used. For example, the controller 10 detects the supply voltage abnormality when a voltage drop in which the supply voltage drops below about 5.1 V is detected.

Finally, in the control shaft position detection step (S40), the controller 10 checks the position of the control shaft 2-2 of the CVVD controller 2 based on the rotation detection value of the cam shaft of the auxiliary cam sensor 7 provided at the middle portion of the camshaft 5. The reason is that when the short duration and long duration control according to the learning abnormality are performed, the signal value (cam shaft rotation detection value) detected by monitoring the auxiliary cam sensor 7 may be replaced with a long duration signal value for the long duration control, and a short duration signal values for control, respectively.

From this, the controller 10 performs the control shaft location detection step (S40) and then proceeds to a learning value verification control (S50 to S80, S50-1 to S80-1) through each step of the learning abnormality entry control (S10 to S40) when each condition of the hardware abnormality detection step (S10), the learning value storage failure check step (S20), and the supply voltage abnormality detection step (S30) are not satisfied.

Referring again to FIGS. 1A and 1B, the controller 10 divides the learning value verification control (S50 to S80, S50-1 to S80-1) into the long position verification control (S50 to S80) and the short position verification control (S50-1 to S80-1).

Specifically, the long position verification control (S50 to S80) is performed in the long duration control execution step (S50), the long camshaft output verification step (S60 to S70), and the long duration learning normal check step (S80). In addition, the short position verification control (S50-1 to S80-1) is performed in a short duration control execution step (S50-1), an auxiliary cam sensor short output verification step (S60-1 to S70-1), and a short duration learning normal check step (S80-1).

The controller 10 may perform the long duration control execution (S50) to the short duration control execution (S50-1) among the long duration and the short duration for the learning verification. The reason is that the duration in the engine of the CVVD system 1 is a factor for controlling the amount of intake air, and a large amount of air is sucked in the long duration compared to the short duration to make the actual amount of air be insufficient or increased compared to the targeted amount of air in the abnormal duration learning, and therefore the start-off of the vehicle may occur.

Figure 4:
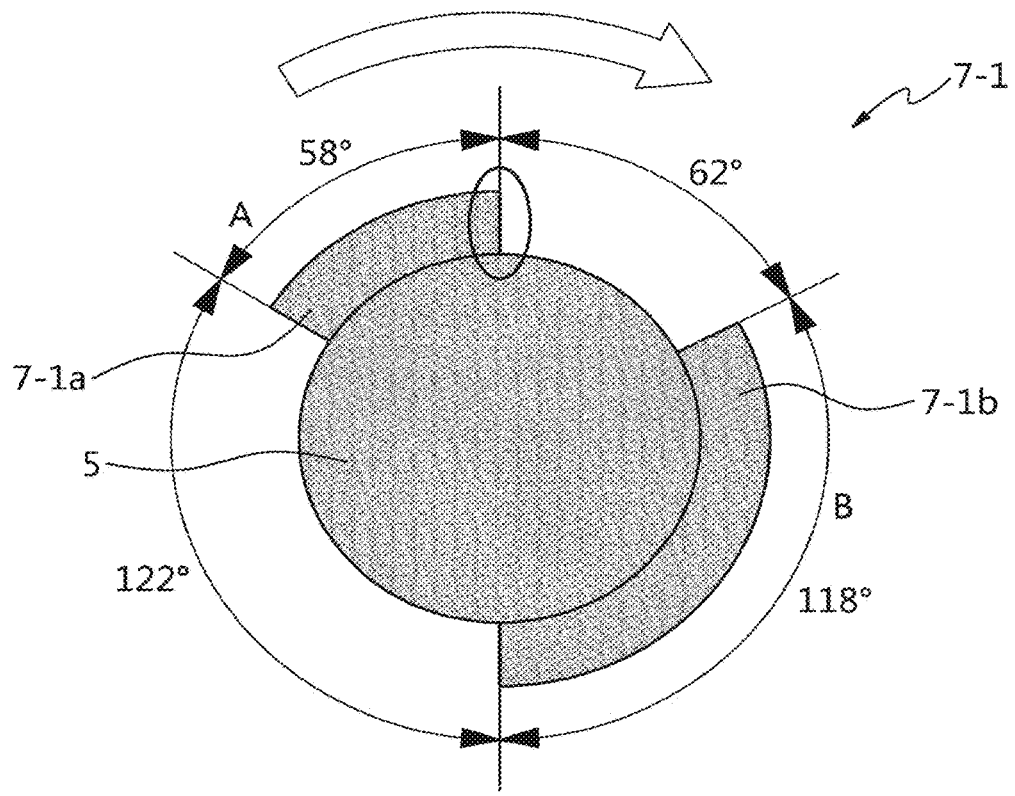
FIG. 4 is a diagram showing an example of signal values of an auxiliary cam sensor for short/long duration positions of a control shaft.

Referring to FIG. 4, the ground that the controller 10 applies a long duration threshold to the HIGH SIGNAL A, B of the auxiliary cam sensor 7 for the auxiliary cam sensor long output verification step (S60 to S70), and applies a short duration threshold to HIGH SIGNAL A, B of the auxiliary cam sensor 7 for the auxiliary cam sensor short output verification steps (S60-1 to S70-1) is exemplified.

As shown, the auxiliary cam sensor 7 is provided with an auxiliary target wheel 7-1 for checking the short/long duration positions of the control shaft 2-2, and the auxiliary target wheel 7-1 includes an A protrusion 7-1a and a B protrusion 7-1b protruding from the periphery of the camshaft 5 at positions spaced apart from each other. Specifically, the position of the B projection 7-1b occupies about 118° in a 62 to 180° section in which a 0 to 62° section is excluded from a 0° to 180° section of 360° of a circular section, whereas the position of the A protrusion 7-1a occupies about 58 region in a 302 to 360° section in which a 180 to 302° section is excluded from a 180° to 360° section of 360° of a circular section. That is, the B protrusion 7-1b sets about 118° region to be a protruding portion in the 62-180° section of the 360° circular section of the cam shaft 5, and the A protrusion 7-1a sets about 58° region to be a protruding portion in the 302-360° section of the 360° circular section of the cam shaft 5.

Therefore, the A projection 7-1a generates the cam sensor signal value according to each of the short/long durations measured for the CVVD learning abnormality diagnosis as the HIGH SIGNAL A, and the B projection 7-1b generates the cam sensor signal value according to each of the short/long durations measured for the CVVD learning abnormality diagnosis as the HIGH SIGNAL B.

From this, the controller 10 divides the auxiliary cam sensor long output verification (S60 to S70) into THD_1<HIGH SIGNAL A<THD_2 in S60 and THD_3<HIGH SIGNAL B<THD_4 in S70, and divides the auxiliary cam sensor short output verification (S60-1 to S70-1) into THD_5<HIGH SIGNAL A<THD_6 in S60-1 and THD_7<HIGH SIGNAL B<THD_8 in S70-1. Here, "HIGH SIGNAL A, B" represents the signal value of the auxiliary cam sensor 7 for the long/short duration control, "THD_1" represents a HIGH SIGNAL long duration A lower threshold, "THD_2" represents a long duration A upper threshold, "THD_3" represents a long duration B lower threshold, "THD_4" represents a HIGH SIGNAL long duration B upper threshold, "THD_5" represents a short duration A lower threshold, "THD_6" represents a short duration A upper threshold, "THD_7" represents a short duration B lower threshold, and "THD_8" represents a short duration B upper threshold. "<" is an inequality signal representing a magnitude of two values.

Therefore, when both the THD_1<HIGH SIGNAL A<THD_2 and the THD_3<HIGH SIGNAL A<THD_4 satisfy the conditions, the controller 10 enters the long duration learning normal check (S80) to complete the learning verification for the long duration. In addition, when both the THD_5<HIGH SIGNAL A<THD_6 and the THD_7<HIGH SIGNAL B<THD_8 satisfy the conditions, the controller 10 enters the short duration learning normal check (S80-1) to complete the learning verification for the short duration.

For this purpose, each of THD_1/THD_2 (S60), THD_3/THD_4 (S70), THD_5/THD_6 (S60-1), and THD_7/THD_8 (S70-1) representing the threshold, "THD_1=99°", "THD_2=180°", "THD_3=260°", "THD_4=360°", "THD_5=137°", "THD_6=180°", "THD_7=222°", "THD_8=360°" may be applied. Therefore, for the HIGH SIGNAL A at THD-1 (99°)<HIGH SIGNAL A<THD_2 (180°), a signal holding time corresponding to 81°, for the HIGH SIGNAL B at THD_3 (260°)<HIGH SIGNAL B<THD_4 (360°), a signal holding time corresponding to 100°, for the HIGH SIGNAL A at THD_5(137°)<HIGH SIGNAL A<THD_6(180°), the a signal holding time corresponding to 43°, and at THD_7 (222°)<HIGH SIGNAL B<THD_8 (360°), a signal holding time corresponding to 138° is applied as the threshold satisfying condition.

FIG. 5 shows that the controller 10 applies the stopper 2-3 to each of the long duration learning normal check (S80) and the short duration learning normal check (S80-1).

For example, the left in FIG. 5 shows that the long duration learning normal check (S80) is made by verifying the RPM of the motor 2-1 measured by rotating the motor 2-1 connected to the end of the control shaft 2-2 until the long durations stop positions of the left and right are checked by the contact with the stopper 2-3 (S80). In this case, the controller 10 stores the RPM of the motor 2-1, in which the long duration learning normal check (S80) is made, in the CVVD learning map 10-2 or the memory as the learning value.

For example, the right in FIG. 5 shows that the short duration learning normal check (S80) is made by verifying the RPM of the motor 2-1 measured by rotating the motor 2-1 connected to the end of the control shaft 2-2 until the short durations stop positions of the left and right are checked by the contact with the stopper 2-3 (S80-1). In this case, the controller 10 stores the RPM of the motor 2-1, in which the short duration learning normal check (S80-1) is made, in the CVVD learning map 10-2 or the memory as the learning value.

On the other hand, referring to FIG. 2, the controller 10 immediately switches to the re-learning control (S100 to S160) instead of entering the control shaft position detection (S40) when any one of each condition of the hardware abnormality detection (S10), the learning value storage failure check (S20), and the supply voltage abnormality detection (S30) is found in the learning abnormality entry control (S10 to S40). In addition, the controller 10 switches to the re-learning control (S100 to S160) when any one of the conditions of THD_1<HIGH SIGNAL A<THD_2 (S60) and THD_3<HIGH SIGNAL B<THD_4 (S70) is not satisfied in the long position verification control (S50 to S80) or any one of the conditions of THD_5<HIGH SIGNAL A<THD_6(S60-1) and THD_7<HIGH SIGNAL B<THD_8 (S70-1) is not satisfied in the short position verification control (S50-1 to S80-1).

The re-learning control (S100 to S160) checks the RPM of the motor by re-learning the long duration and the short duration, and then stores it as a learning value. To this end, the re-learning control (S100 to S160) is divided into the motor location learning abnormality storage step in S100, the ignition timing determination step in S110, the motor location re-learning execution step of S120, the CVVD re-learning request step in S130, the long duration control execution step in S140, the short duration control execution step in S150, and the long/short duration learning value storing completion step in S160.

For example, the motor location learning abnormality storage (S100) is performed by allowing the controller 10 to store the long/short duration positions for the RPM of the motor 2-1 which brings the learning abnormality to the CVVD learning map 10-2. The ignition timing determination (S110) determines the next ignition timing at which the learning abnormality is brought in the learning abnormality entry control (S10 to S40). As described above, the reason why the determination of the next ignition timing is desired is that the sudden output change in the engine may occur when the re-learning is performed at the time of engine running after the existing learning value is reset (i.e., ignition timing of the learning abnormality).

For example, the motor location re-learning execution (S120) means the re-learning entry of the controller 10, the re-learning request (S130) means the generation of the output for the long duration control among the long duration and the short duration in the motor 2-1, and the long duration control execution (S140) and the short duration control execution (S150) each means the acquisition of the learning value through the long duration and the short duration. In this case, each procedure of the long/short duration control execution (S140 and S150) is the same as the existing long/short duration location learning procedure. That is, the existing long/short duration location learning procedure is a method for allowing the controller 10 to apply a specific duty (for example, 50% duty) for a specific time (ms), checking the long/short duration stop positions of the motor 2-1 by the contact with the stopper 2-3 while the motor 2-1 rotates left and right as shown in FIG. 5, and then measuring the RPM of the motor 2-1 to acquire the learning value at the stop position.

For example, in the learning value storage completion (S160), the learning value obtained by measuring the RPM of the motor 2-1 is stored in the CVVD learning map 10-2 or memory by the controller 10.

Figure 6:
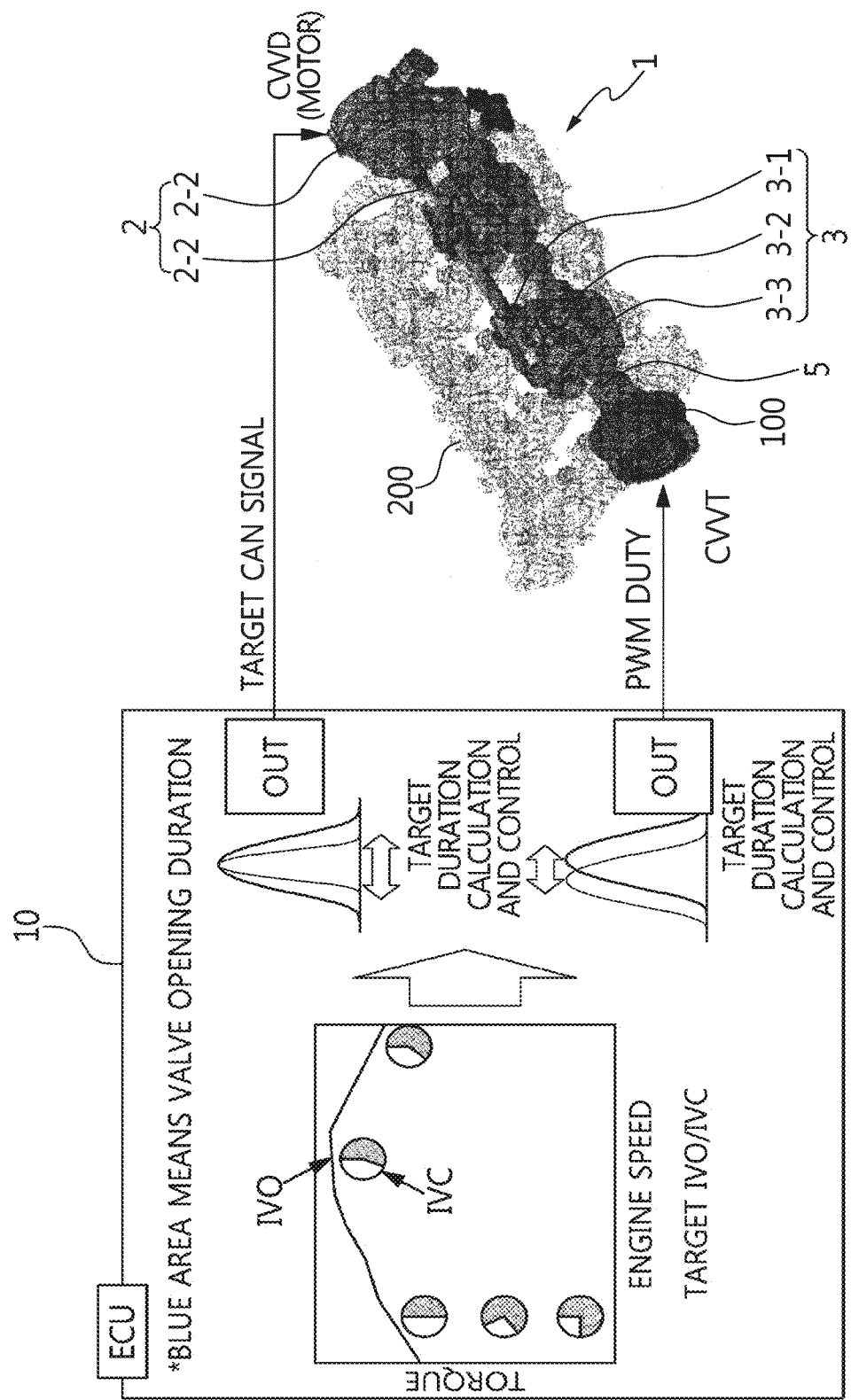
FIG. 6 is a diagram showing a CVVD system operation state after the verification and re-learning of the CVVD location learning result.

Meanwhile, referring to FIG. 6, a control strategy of the controller 10 for operating the CVVD system 1 and the CVVT system 100 using the verified learning value or the re-learning value is illustrated.

As shown, the control strategy is based on setting a target timing/duration in accordance with an operation region, and determines the target timing/duration to the time designation of the intake valve open (IVO) and the intake valve close (IVC). Next, the oil control valve of the CVVT system 100 is controlled to follow up the target timing and the rotation position of the motor 2-1 is controlled to follow up the target duration. Therefore, the CVVD system 1 is operated with the control strategy of the controller 10 using the learning value or the re-learning value verified for the duration control together with the individual control for the opening/closing time of the intake valve.

As described above, the method for verifying a CVVD location learning result applied to the CVVD system 1 according to the present aspect determines the verification necessity or desirability for the existing learning values on the condition of the CVVD system hardware abnormality, the learning value abnormality, and the motor voltage abnormality, respectively, performs the learning value verification control, performs the learning value verification control using the rotation detection value of the camshaft 5 of the auxiliary cam sensor 7 utilized for the position confirmation for the control shaft 5 of the motor 2-1 when the learning value is required to be verified, prevents the start-off of the engine/idle instability/deterioration in fuel economy due to the learning abnormality by the learning value verification control by performing the learning on the long duration and the short duration by switching to the re-learning control when the learning is required to be verified, and in particular, prevents the occurrence in the sudden output change of the engine according to the re-learning by applying the ignition timing to the re-learning control after the learning abnormality timing.

The CVVD system of the present disclosure may, in one form, realize the following actions and effects by verifying the CVVD location learning result by the auxiliary cam sensor data.

First, it is possible to determine whether or not each part of the hardware constituting the CVVD system is normal based on items corresponding to the on board diagnosis (OBD) regulations by using the auxiliary cam sensor applied to the middle position of the camshaft as the information. Second, the alignment of the motor assembly (for example, control shaft, housing, link) can be determined based on the data of the auxiliary cam sensor. Third, by eliminating various causes which occur due to the hardware aspects such as the motor power abnormality, the connector detachment, and the CVVD microcomputer fail during the CVVD location learning process, the generation of the learning results which cannot control the air volume is prevented. Fourth, the accurate air volume control is secured according to the learning results, so that the start-off of the engine, the idle instability, the deterioration in fuel economy, and the like are all prevented when the CVVD system is operated.

The present disclosure is not limited to the foregoing description and the accompanying drawings. Accordingly, those skilled in the art will appreciate that substitutions, modifications and variations can be made without departing from the spirit and scope of the disclosure.

What is claimed is:

1. A continuously variable valve duration (CVVD) system, comprising:
   a controller configured to:
      determine, by a data input unit of the controller, whether a learning value acquired in a short duration and a long duration of the CVVD system is required to be verified;
      determine, by a CVVD learning map of the controller, whether the acquired learning value should be verified based on conditions of each of a CVVD system hardware abnormality, a learning value abnormality, and a motor voltage abnormality, wherein a learning value verification control is performed when all of the conditions are not satisfied; and
      perform the learning value verification control by comparing a position of a stopper of a control shaft connected to a motor with a cam shaft rotation value, generated by a first protrusion or a second protrusion of a cam shaft during a rotation of the cam shaft, wherein the cam shaft rotation value is detected by an auxiliary cam sensor by detecting the rotation of the cam shaft by recognizing the first protrusion or the second protrusion of the cam shaft, wherein the learning value verification control is divided into a long position verification control and a short position verification control, and wherein in the long position verification control a cam shaft rotation value detected by the auxiliary cam sensor is applied to a first threshold, and wherein in the short position verification control a second threshold is applied to the cam shaft rotation value detected by the auxiliary cam sensor;

a cam sensor provided at an end portion of the cam shaft;

an auxiliary cam sensor positioned at a middle portion of the cam shaft; and a CVVD learning verification map configured to provide a signal indicating whether a hardware abnormality, a learning value abnormality, or a motor voltage abnormality is present in the CVVD system.

2. The CVVD system of claim 1, wherein the auxiliary cam sensor generates a rotation detection value of the cam shaft by the first protrusion and the second protrusion of an auxiliary target wheel provided at the middle portion of the cam shaft.

3. The CVVD system of claim 1, wherein the controller controls a continuously variable valve timing (CVVT) system to directly control the cam shaft.

* * * * *